May 21, 1946.  F. C. KLEIN  2,400,646
SEEDER ATTACHMENT FOR TRACTORS
Filed Aug. 4, 1943  2 Sheets-Sheet 1
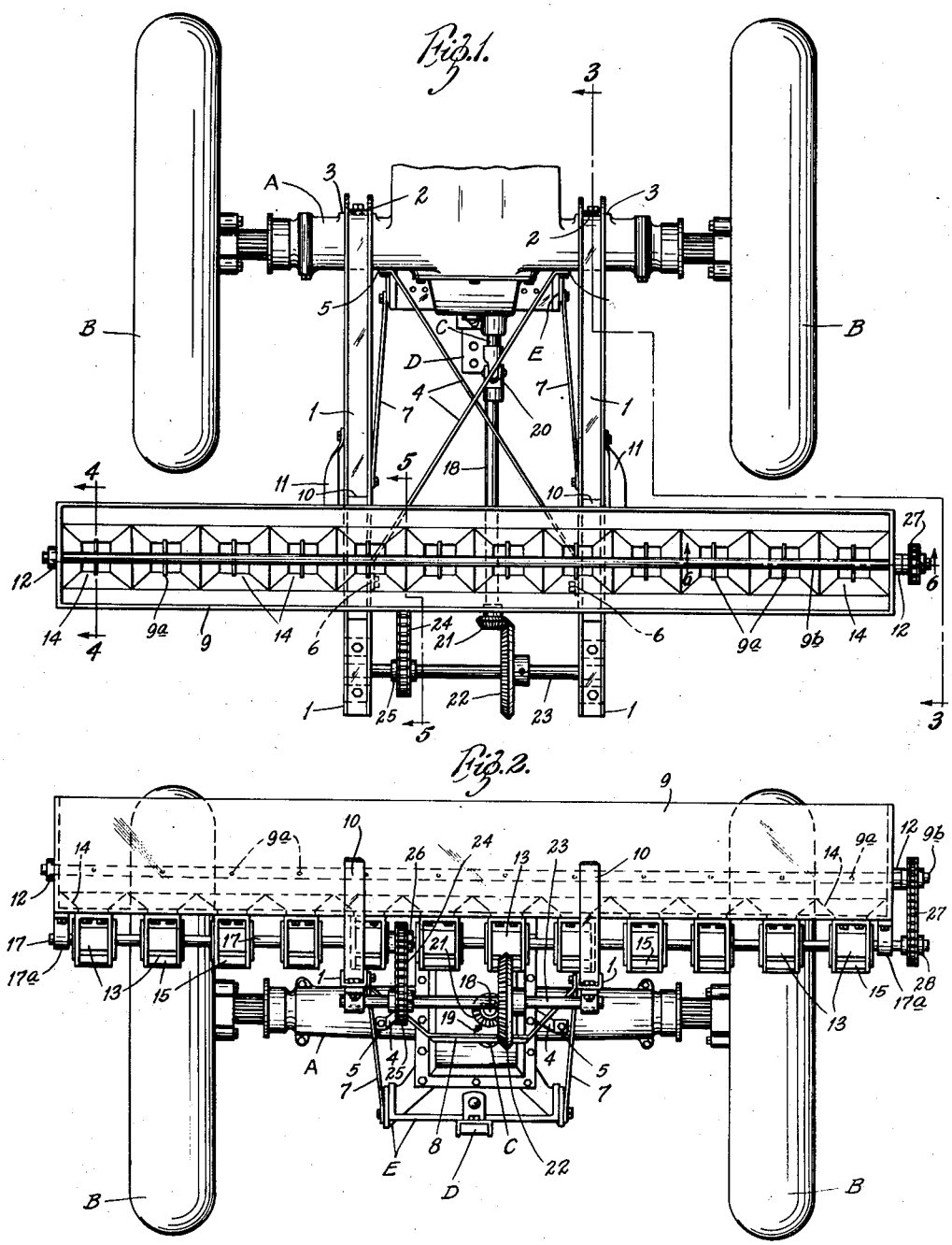

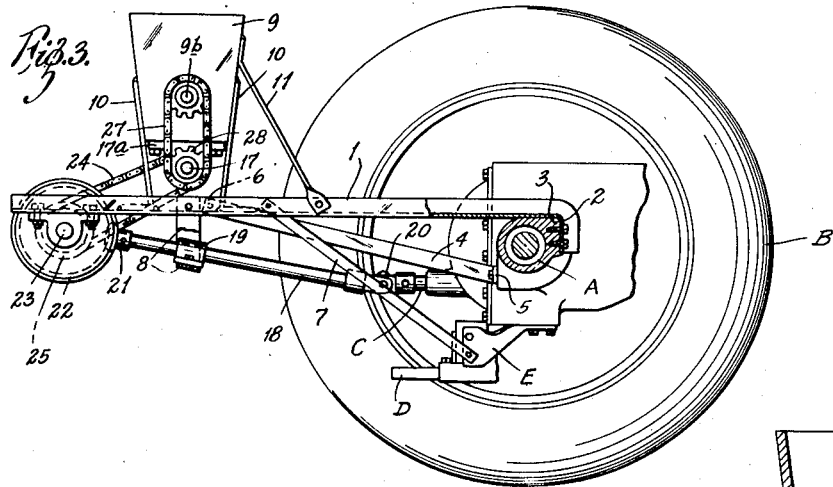

Patented May 21, 1946

2,400,646

UNITED STATES PATENT OFFICE 2,400,646

SEEDER ATTACHMENT FOR TRACTORS

Ferdinand C. Klein, Smithton, Mo.

Application August 4, 1943, Serial No. 497,294

1 Claim. (Cl. 275—2)

This invention relates to seeder attachments for tractors. The principal objects of the invention are to provide a simple and economical, strong and durable light-weight seeder attachment that can be readily mounted on and dismounted from the tractor axle, to provide a simple and efficient quick attachable and detachable driving connection between the power take-off of the axle and the seeding mechanism of the tractor attachment and to dispense with the use of separate supporting wheels for said attachment. The invention consists in the tractor attachment and in the combinations and arrangements of parts hereinafter described and claimed.

In the accompanying drawings, wherein like symbols refer to like parts wherever they occur, Fig. 1 is a plan view of the rear driving axle portion of a tractor provided with a seeder attachment embodying my invention, Fig. 2 is a rear elevational view of the parts shown in Fig. 1, Fig. 3 is a vertical longitudinal sectional view on the line 3—3 in Fig. 1, Fig. 4 is a vertical cross-sectional view through the grain box on the line 4—4 in Fig. 1, Fig. 5 is a fragmentary vertical longitudinal sectional view on the line 5—5 in Fig. 1; and Fig. 6 is a fragmentary vertical sectional view through the grain box on the line 6—6 in Fig. 1.

In the accompanying drawings my seeder attachment is shown mounted on the rear driving axle A of a tractor, said axle being supported at its ends on wheels B and provided intermediate between its ends with a rearwardly projecting power take-off C and a draw bar D supported on a bracket E fixed to said axle. The tractor construction just described is well known and it is considered unnecessary to illustrate it in detail.

My seeder attachment comprises a pair of spaced parallel side frame members 1, preferably of channel-shaped section, disposed one on each side of the power take-off C of the tractor axle A. The side frame members 1 seat on the top of the tractor axle A and have depending front end portions 2 that are bolted or otherwise rigidly secured flatwise to seats 3 provided on the front side of said axle for various tractor attachments. The side frame members 1 extend rearwardly of the axle A beyond the wheels B thereof after the manner of cantilevers.

The attachment is strengthened and stiffened by means of a pair of diagonal cross braces 4 each having its forward end 5 removably secured to the tractor axle A on one side of the power take-off C and having its rear end 6 rigidly secured to the inner side face of the side frame member 1 on the other side of said power take-off. The attachment is further stiffened and strengthened by braces 7 that are removably secured at their lower ends to the opposite side of the draw bar supporting bracket E of the axle A and are inclined rearwardly and upwardly and rigidly secured to the frame members 1. The side frame members are also rigidly connected near the rear ends of the cross braces 4 by means of a cross bar or strap 8.

Supported on the cantilever side frames 1 of the attachment rearwardly of the rear driving axle wheels B of the tractor is a grain box 9 that is disposed crosswise of and supported on and spaced above said side frames by means of suitable legs 10 and inclined braces 11. The grain box 9 is provided with the usual rotary grain agitators 9a that are mounted on a shaft 9b that extends longitudinally of said box and is journaled in suitable bearings 12 in the end walls thereof. The grain box 9 is also provided with the usual grain discharge or seeding mechanism in the form of a series of seed cups 13 that are spaced apart longitudinally of said box and open upwardly into the interior thereof into grain hoppers 14 in the bottom thereof. The lower portions of the seed cups 13 are provided rearwardly of the cross bar 8 with rearwardly and downwardly opening outlet or discharge openings 15; and the grain is fed from the grain box 9 through said openings by means of fluted feed wheels 16 located in said cups. The feed wheels 16 are supported on and driven by a single shaft 17 that is disposed beneath and extends longitudinally of the grain box 9 through the seed cups 13 and the feed wheels 16 therein and is journaled in suitable bearings 17a fixed to the bottom of said box.

Power is transmitted from the power take-off C of the tractor axle A to the seeding mechanism by means of a driving mechanism mounted on and forming a part of the seeder attachment. This driving mechanism comprises a main driving or propeller shaft 18 that is located between the cantilever side frame members 1 and extends beneath the grain box 9. The drive shaft is supported in a suitable bearing 19 mounted on the cross bar 8 that connects said side frame members adjacent to the grain box 9. The forward end of the drive shaft 18 is provided with a suitable universal joint 20 adapted for endwise attachment to and detachment from the rearwardly extending power take-off C of the tractor axle A. The rear end of the drive shaft 18 terminates rearwardly of the grain box 9 and has a bevel pinion 21 secured thereto that intermeshes with a bevel gear 22 fixed to a shaft 23 that extends from side frame member to side frame member and is supported at its ends in suitable bearings fixed to said side frame members.

The drive is transmitted from the bevel gear shaft 23 to the seeding mechanism of the attachment by means of a sprocket chain 24 which cooperates with a drive sprocket 25 fixed to said shaft and a driven sprocket 26 fixed to the shaft 17 for driving the fluted feed wheels 16; and the agitator shaft 9b is driven from the feed wheel shaft 17 by means of a sprocket chain 27 which passes around a drive sprocket wheel 28 on the feed wheel shaft and a driven sprocket wheel on the agitator shaft.

The hereinbefore described seeder attachment has several important advantages. It is of strong, rigid and economical construction and can be readily mounted on and dismounted from the tractor axle and quickly and easily connected to and disconnected from the power take-off of the axle and provides a simple and efficient mechanism for driving the seeding and agitating mechanism from the power take-off. The attachment is supported from the tractor axle without the use of separate supporting wheels; and a disk or other covering implement may be drawn by the tractor back of the seeder attachment to cover seed all in one operation.

What I claim is:

A seeder attachment for a tractor having a wheeled driving axle with a rearwardly extending power take-off shaft, said attachment comprising a pair of spaced side frame members adapted to seat on the top of said axle between the wheels thereof and on opposite sides of said power take-off shaft and having downwardly bent front end portions adapted to be secured directly to the front face of said axle, whereby said side frame members are adapted to extend rearwardly from said axle after the manner of cantilever beams, crossed braces secured at one end to the respective side frame members and at the other end to said axle on opposite sides of said power take-off, a grain box mounted on said side frame members rearwardly of the axle wheels, a seed feeding mechanism for said box, a cross brace connecting said side frame members adjacent to said box and means mounted entirely on said attachment for transmitting power from said power take-off shaft to said seeding mechanism, said means comprising a longitudinal drive shaft journaled on said cross brace below the level of said side frame members and adapted for connection at one end with said power take-off shaft of said axle, a cross shaft journaled on said side frame members below the level thereof and rearwardly of said grain box, a driving connection between said cross shaft and seeding mechanism, and a driving gear connection between said drive and cross shafts.

FERDINAND C. KLEIN.